United States Patent
Pappas

(10) Patent No.: US 6,883,771 B2
(45) Date of Patent: Apr. 26, 2005

(54) ROLLED CANDLE FABRICATION AND APPARATUS

(75) Inventor: George G. Pappas, Norwich, OH (US)

(73) Assignee: Lumi-Lite Candle Company, Inc., Norwich, OH (US)

( * ) Notice: Subject to any disclaimer, the term of this patent is extended or adjusted under 35 U.S.C. 154(b) by 183 days.

(21) Appl. No.: 10/071,592

(22) Filed: Feb. 8, 2002

(65) Prior Publication Data

US 2003/0151161 A1 Aug. 14, 2003

(51) Int. Cl.⁷ .............................................. B29C 39/10
(52) U.S. Cl. ........................ 249/117; 425/470; 425/803
(58) Field of Search .................................. 425/470, 803; 249/117, DIG. 1; 431/288–293

(56) References Cited

U.S. PATENT DOCUMENTS

| | | |
|---|---|---|
| 3,225,412 A | 12/1965 | Widell et al. |
| 5,395,233 A | 3/1995 | Karp |
| 5,804,123 A | 9/1998 | Klomhaus et al. |
| 5,833,906 A | 11/1998 | Widmer |
| 6,371,755 B1 * | 4/2002 | Dearth ....................... 431/291 |

FOREIGN PATENT DOCUMENTS

| | | | |
|---|---|---|---|
| DE | 2526023 A1 | * | 12/1976 |
| GB | 1490547 | * | 11/1977 |

* cited by examiner

Primary Examiner—James P. Mackey
Assistant Examiner—Donald Heckenberg
(74) Attorney, Agent, or Firm—Frank H. Foster; Kremblas, Foster, Phillips & Pollick

(57) ABSTRACT

A method for making a spiral fuel body for a layered candle is disclosed. Layers of a non-liquid candle fuel are successively poured into a mold and cooled to a non-liquid state. The layers bond together in the mold, and are removed as a sheet of candle fuel, which is rolled into the spiral fuel body. Each layer is distinguishable from the other layer for the life of the candle by color, aroma, and thickness. A mold that can be used for making a rolled candle has obtuse sides for producing a tapered form to the candle.

6 Claims, 5 Drawing Sheets

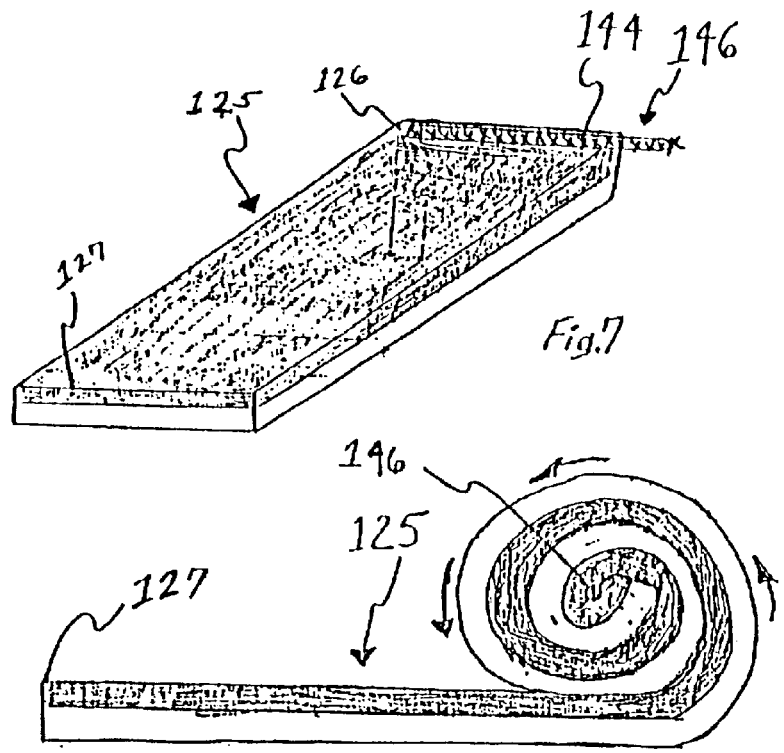
Fig. 7
Fig. 8
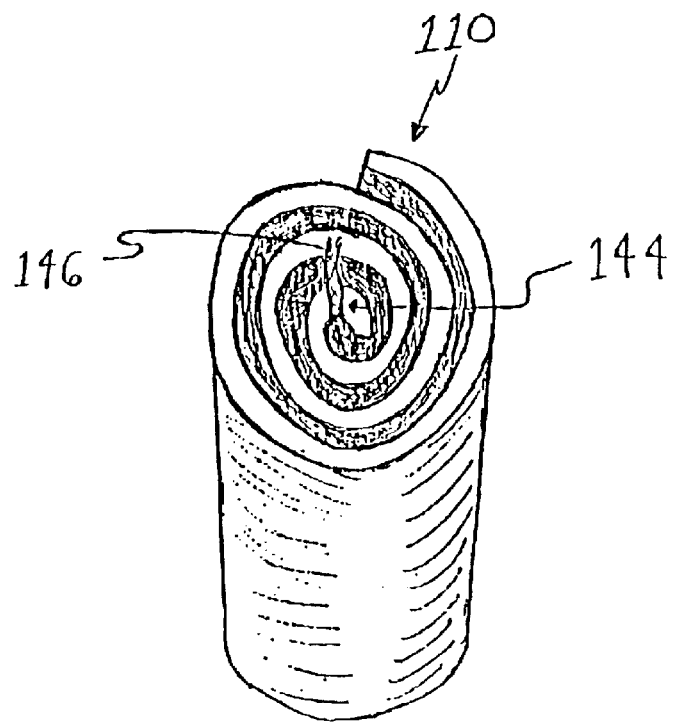
Fig. 9

ROLLED CANDLE FABRICATION AND APPARATUS

BACKGROUND OF THE INVENTION

1. Field of the Invention

The present invention relates generally to candles, and more specifically to a method of forming a layered sheet of candle fuel for rolling into a spiral fuel body for a candle.

This invention further relates to a mold apparatus used to form a pliable sheet of candle fuel for rolling into a spiral candle fuel body that presents a pleasing design, including one that simulates a pastry product.

2. Description of the Related Art

A candle is typically made by pouring a liquefied candle fuel, such as molten wax into a mold and cooling the fuel, thereby forming a fuel body for the candle. A wick is inserted into the fuel body to make the fuel body function as a candle.

In one way of making a pillar candle, which is a cylindrical candle usually having a height greater than its width, the wick is placed upright in a cylindrical mold, and the fuel is poured into the mold. The fuel is poured to a level at which a majority of the wick is submerged in the molten fuel, and a top portion of the wick remains above a top surface of the molten fuel. When the molten fuel solidifies, the fuel body is formed with the wick imbedded therein. The top portion of the wick extends from the top surface of the fuel body for initially lighting the candle.

Other processes that are utilized for making candles include the compression of prilled wax pellets, and the extrusion of a candle fuel. The processes produce a fuel body in which a hole can be formed for inserting a wick, and the processes permit an artisan to employ techniques for making the fuel body have a particular size and shape.

Another method of candle making forms a candle fuel in deliberately indistinguishable layers around a wick. For example, serially dipping the wick in the candle fuel, which is typically molten wax, and allowing the wax to cool into a layer around the wick forms a dipped candle. Repeating this technique builds concentric layers around the wick. The dipped candle typically has a tapered top end, from which a top portion of the wick extends for lighting the candle, and a substantially planar bottom surface. Most commonly, all the layers are of the same color. When viewing the bottom surface, the concentric layers are usually indistinguishable, because the layers are of the same color and the outermost layer typically coats the bottom surface. However, for making the layers distinguishable there exists a technique in which the dipped candle is formed using a colored wax for each concentric layer. Some or all of the layers have different colors. Selected areas of the candle are carved away or cut into, usually in decorative patterns, to expose the multiple colors of the different layers.

Similarly, a molded pillar candle or a dipped candle having built up layers of a single color can be coated with a final layer of a different colored wax.

A less well-known method for making a candle is to roll a sheet of candle fuel from a slab, which has a length and width considerably greater than its thickness. A wick is placed near an edge of the slab, lying parallel to that edge, with an overhanging portion of the wick extending past an adjacent edge. Then, beginning with the edge near the wick, the slab is rolled around the wick, thereby forming a rolled fuel body. A majority of the wick becomes imbedded centrally in the rolled fuel body, with the overhanging portion of the wick extending beyond a top surface of the rolled fuel body. Viewing the top surface, the rolled fuel body appears layered, because it is in a spiral pattern around the centrally imbedded wick. However, the spiral pattern and layered appearance may not be clearly seen, for example, if the top surface is smoothed over to eliminate the visible interface within the spiraling layer, which may be done for aesthetic purposes.

For the methods described above that utilize a mold, and for other candle-making methods that utilize a mold for forming a fuel body, the mold has a predetermined shape for ultimately incorporating into a candle. Such shapes typically serve an aesthetic purpose, although shapes may be imposed to serve a functional role. For the pillar candle, the shape of the candle elicits the method of manufacturing the candle; the shape of the mold is retained through the method and is reflected in the shape of the candle. However, for the rolled candle and the dipped candle, the respective methods of manufacture may not be readily deduced by observing the shapes of those candles.

One such method utilizing a mold with a defined structure for imposing aesthetic shapes onto a fuel body is disclosed in U.S. Pat. No. 5,833,906 to Widmer. The method disclosed by Widmer is for making a novelty candle, which has flat surfaces for incorporating defined wax shapes. The wax shapes are arranged in a mold having an interior defined by flat sidewalls. Liquefied wax is poured into the mold, and at least one of the flat surfaces of the candle is contacted flush against the wax shapes. The liquefied wax cools and the shapes bond to the flat surface of the candle, which is then removed from the mold.

While many methods exist for producing candles having various shapes, there is a need for a method of making a layered sheet for rolling into a layered fuel body for a candle, which is thereby given an aesthetically pleasing and novel appearance. There is a need for a layered fuel body for a candle, in which the individual layers of candle fuel remain distinguishable throughout the life of the candle.

There is also a need for a mold apparatus that forms a sheet of candle fuel having structures that become incorporated into a rolled fuel body to provide functional advantages for a candle. There is a further need for a mold apparatus that forms a sheet of candle fuel having structures that become incorporated into a rolled fuel body for making an aesthetically pleasing and novel candle.

BRIEF SUMMARY OF THE INVENTION

The invention is a method for making a rolled, layered candle. A series of liquefied candle fuel layers are poured into a mold with each layer being cooled to a non-liquid state before the next layer is poured. The layers bond together in the mold as a plurality of distinctive layers, and are removed from the mold as a unitary sheet of candle fuel. The sheet is rolled into a fuel body for the candle.

A wick is inserted in the fuel body by rolling the sheet around the wick. Alternatively, the sheet can be rolled into the fuel body, and the wick can be inserted into at least one hole formed in the fuel body.

The present invention also provides a mold apparatus for fabricating a sheet of candle fuel for making a rolled candle. The mold has a sidewall formed substantially perpendicular to a bottom wall, and an opposing sidewall formed obtuse to the bottom wall. The mold has an end wall formed substantially perpendicular to the bottom wall and an opposing end wall formed obtuse to the bottom wall.

BRIEF DESCRIPTION OF THE SEVERAL VIEWS OF THE DRAWINGS

FIG. 7 is a view in perspective illustrating an intermediate step in a first alternative method.

FIG. 8 is a side view illustrating an intermediate step in the alternative method of FIG. 7.

FIG. 9 is a view in perspective illustrating a candle formed by the alternative method of FIGS. 7 and 8.

Figure 1:
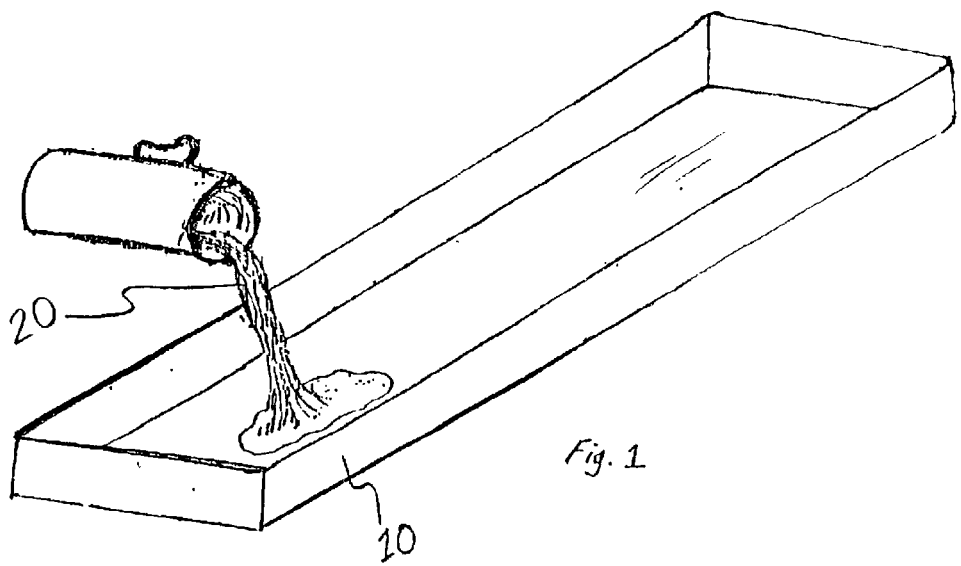
FIG. 1 is a view in perspective illustrating the beginning part of the first step in the preferred method.

In describing the preferred embodiment of the invention, which is illustrated in the drawings, specific terminology will be resorted to for the sake of clarity. However, it is not intended that the invention be limited to the specific term so selected, and it is to be understood that each specific term includes all technical equivalents that operate in a similar manner to accomplish a similar purpose.

DETAILED DESCRIPTION OF THE INVENTION

Figure 2:
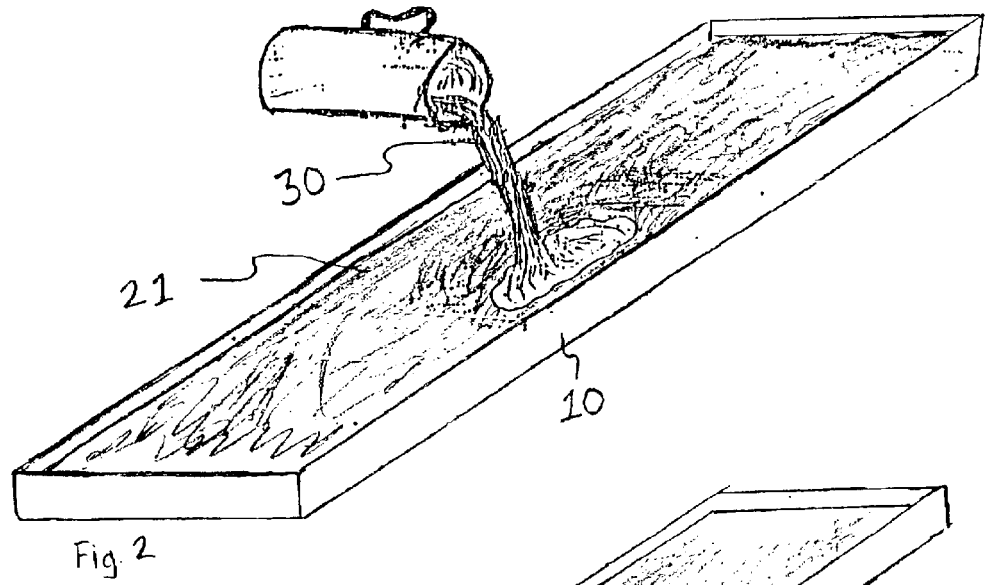
FIG. 2 is a view in perspective illustrating the latter part of the first step in the preferred method.

The invention includes a method for making a layered candle. FIG. 1 shows the beginning of the first step in the method, during which a warmed first liquefied candle fuel 20 is poured into a mold 10. The first liquefied fuel 20 is then cooled to a non-liquid state in the latter part of the first step, thereby becoming a first non-liquid layer 21 of candle fuel, as shown in FIG. 2. Subsequently, a second liquefied fuel 30 is poured onto the first non-liquid layer 21, which remains in the mold 10. The second liquefied fuel 30 solidifies to become a second non-liquid layer 31, as shown in FIG. 3.

Figure 3:
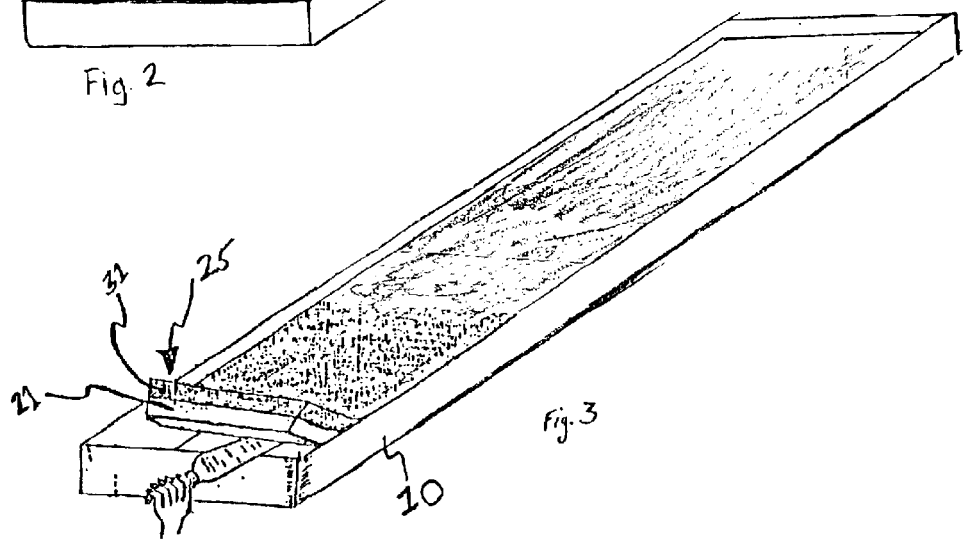
FIG. 3 is a view in perspective illustrating the second step in the preferred method.
Figure 4:
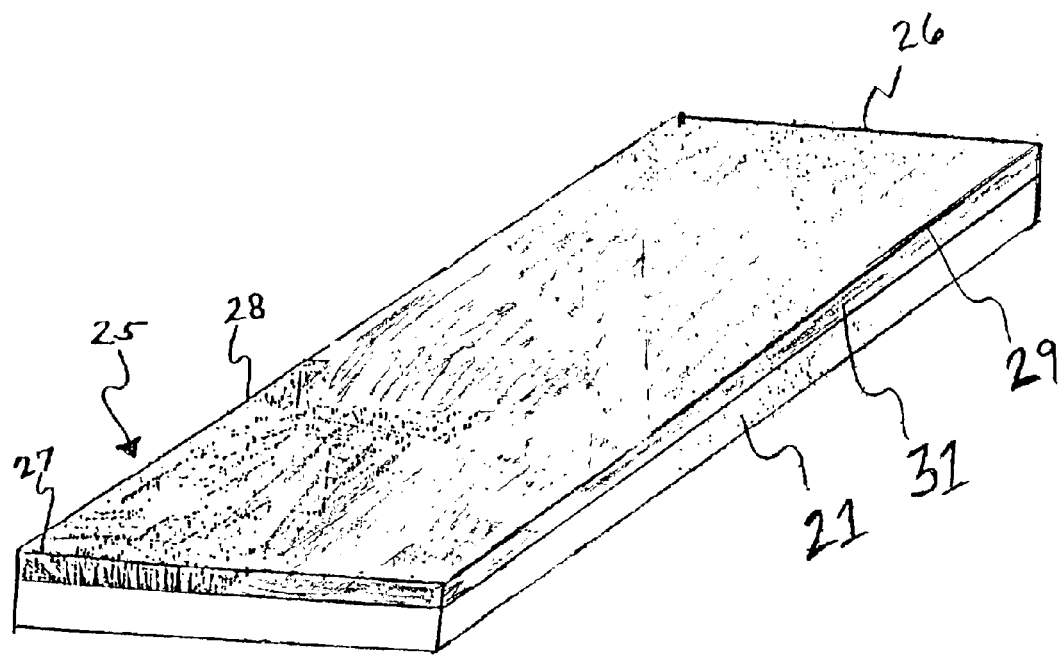
FIG. 4 is a view in perspective illustrating an intermediate structure formed during the preferred method.

Although the first liquefied fuel 20 is cooled to form the first non-liquid layer 21 prior to pouring the second liquefied fuel 30 onto the first non-liquid layer 21, the first and second non-liquid layers 21 and 31 bond together while in the mold 10 to form a composite sheet 25 of non-liquid candle fuel, as shown in FIGS. 3 and 4. A minimal amount of mixing between the first non-liquid layer 21 and the second liquefied fuel 30 occurs, because heat is transferred from the warmer second liquefied fuel 30 to the first non-liquid layer 21. The heat melts a thin layer of the fuel comprising the first non-liquid layer 21, thereby forming a thin interface of melted fuel on the first non-liquid layer 21 that mixes with the second liquefied fuel 30. As the second liquefied fuel 30 cools to form the second non-liquid layer 31, the fuel mixture also reaches the non-liquid state, thereby providing the force that holds the first and second non-liquid layers 21 and 31 together.

Therefore, the term non-liquid means that the first non-liquid layer 21 has solidified to an extent that, when the second liquefied fuel 30 is poured onto the first non-liquid layer 21, no more than only a small amount of the fuel comprising the first non-liquid layer 21 responds by melting and mixing with the second liquefied fuel 30. The term non-liquid also can include even more extensive cooling, even to the point where the first non-liquid layer 21 may be cooled to such an extent that the layer 21 loses all pliability and would not melt and mix with the second liquefied fuel 30. However, reheating the first non-liquid layer 21 can restore the more pliable non-liquid state that is necessary for performing subsequent steps in the method, and so the minimal amount of fuel from the layer 21 melts and mixes with the second liquefied fuel 30 to bond the layers into a composite sheet.

The non-liquid state can be reached by actively or passively causing the temperature of the first liquefied fuel 20 to decrease. For example, placing the mold 10 on a surface that is cooler than the first liquefied fuel 20 actively lowers the temperature of the fuel 20. The heat will be drawn from the fuel 20 to the surface, thereby cooling the fuel 20 into the first non-liquid layer 21. Therefore, the mold 10 is preferably made of a material that can efficiently transfer heat, such as a metal. Similarly, placing the mold 10 in an environment having a lower temperature than the fuel 20 passively lowers the temperature of the fuel 20. The heat from the fuel 20 will dissipate to the cooler environment, thereby cooling the fuel 20 into the first non-liquid layer 21. These techniques apply to the second liquefied fuel 30, as well as to additional liquefied fuels that may be poured to form respective non-liquid layers in alternative embodiments.

Figure 5:
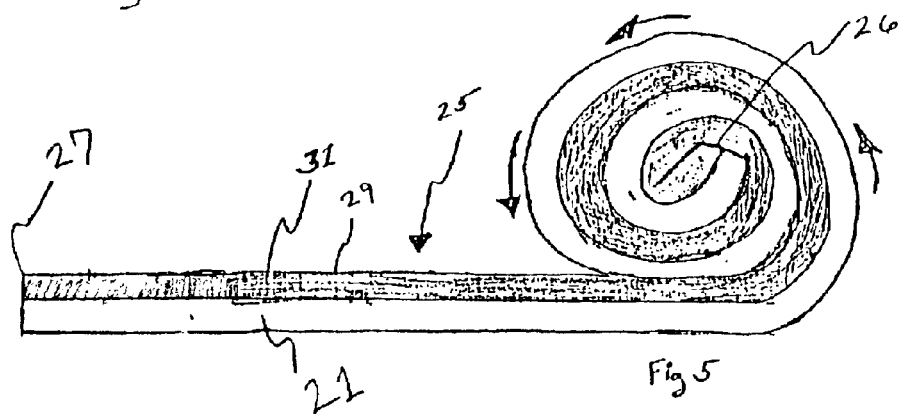
FIG. 5 is a side view illustrating the third step in the preferred method.

Turning to the composite sheet 25 as shown in FIG. 4, the sheet 25 is layered and generally rectangular, having a first edge 26, an opposite second edge 27, and a pair of opposite parallel edges 28 and 29. As shown in FIG. 5, the composite sheet 25 undergoes a rolling step. Preferably, the rolling step is initiated using a leader portion, which is a portion of the composite sheet 25 that is opposite to the second edge 27. The leader portion is a fraction of the length of the composite sheet 25 that extends inwardly from, and includes, the first edge 26. To initiate the rolling step, the leader portion is upturned and curved toward the opposite second edge 27. The parallel edges 28 and 29 bend along their respective lengths, forming a crease in the composite sheet 25 near, and substantially parallel to, the first edge 26. The curving movement continues until the leader portion is folded and the first edge 26 is contacted to the top surface of the composite sheet 25. The second non-liquid layer 31 is the upper layer on the composite sheet 25, so the first edge 26 becomes contacted to the second non-liquid layer 31.

Preferably, the composite sheet 25 is rolled circularly, meaning that an increasing amount of the length of the sheet 25 should be incorporated into the nascent fuel body per revolution, so that a circularly shaped fuel body with a substantially uniform diameter is produced. This means the amount of the composite sheet 25 that is upturned to make the leader portion should have a thickness substantially equal to its length. The length of the leader portion is the length of the composite sheet 25 along the opposing edges 28 and 29 that is upturned, curved, and folded. A leader portion having a length that is longer than its thickness will cause the composite sheet 25 to roll eccentrically into an oblong shape (not shown).

The rolling step should be completed by progressively rolling the leader portion in a winding fashion for the remainder of the length of the composite sheet 25. The remainder of the length of the composite sheet 25 becomes incorporated into the spiral pattern emerging around the leader portion. Each of the opposite edges 28 and 29 should be maintained substantially planar, and parallel to each other, as the rolling step is performed.

The composite sheet 25 must be pliable in order to perform the rolling step. The sheet 25 should be warm and flaccid but have enough structural integrity to remain unitary while being removed from the mold 10. The term pliable means that the sheet 25 can undergo the manipulations in the method without fracturing, such as by cracking and splitting, as stress is translated along its length. The rolling step depicted in FIG. 5 may be performed in an environment that is warm for maintaining the pliability of the sheet 25. However, the sheet 25 may cool at any time during the process, thereby diminishing the pliability to such an extent that the sheet 25 fractures from handling stress while being removed from the mold 10, or while being rolled. In such case, re-heating the composite sheet 25 can restore pliability in order to complete the rolling step.

The preferred fuel type for using in the method is candle wax. Typically, warm candle wax is soft and can be rolled without fracturing. Another type of fuel for using in the method is a gel fuel. However, gel fuels are typically softer than warm wax, so the type of fuel chosen for the method must be rigid enough to remain integral once rolled into a final product. The gel fuel may not require a loss of heat in order to become a non-liquid layer. It is contemplated that the disclosed method can be performed using any fuel type that can undergo the manipulations described herein to form a fuel body. The fuel type must be soft, at least for a length of time to perform the rolling step, but the fuel type must resist collapsing under the force of gravity in order to retain a predetermined shape intended for the candle product. Other examples of fuel types include synthetic waxes, and waxes derived from petroleum, plants, and vegetables.

Figure 6:
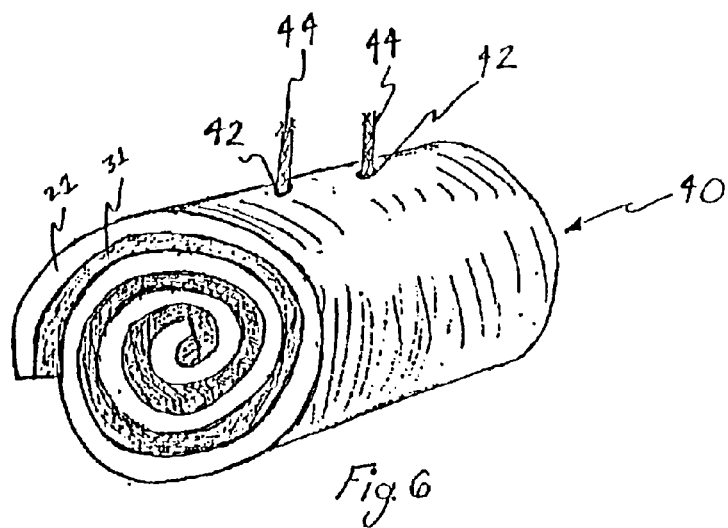
FIG. 6 is a view in perspective illustrating a candle formed by the preferred method.

The rolling step depicted in FIG. 5 may produce a spiral fuel body 40 such as that shown in FIG. 6. The spiral fuel body 40 has a horizontal length that is greater than its diametrical, vertical dimension. At least one hole 42 is formed, such as by drilling, substantially perpendicularly to the first and second non-liquid layers 21 and 31 in the spiral fuel body 40. A wick 44 is inserted into the hole 42. The hole 42 should be formed substantially through the spiral fuel body 40 to maximize the functional life of the candle.

In the preferred method, the first non-liquid layer 21 is thicker than the second non-liquid layer 31. The first liquefied fuel 20 is poured to a depth of about one-half of an inch, and the second liquefied fuel 30 is poured to a depth of about one-fourth of an inch. However, there is a limitation to the thinness and the thickness of the first and second non-liquid layers 21 and 31, and any non-liquid layer formed using this method. If a non-liquid layer is too thin, then it will be indistinguishable from thicker non-liquid layers in a fuel body, producing a candle that lacks the intended aesthetic feature of visibly distinguishable layers. If a layer is too thick, then it may contort during the rolling step, producing a fuel body that lacks the intended predetermined shape and is likely to have noticeable fissures interrupting the spiral pattern.

Alternatively, substantially equal amounts of the first and second liquefied fuels 20 and 30 can be poured into the mold 10, and the thickness of the respective non-liquid layers 21 and 31 can be non-uniform. For example, the mold 10 with the first liquefied fuel 20 may be placed on an unlevel surface to cause an accumulated deeper portion of the first liquefied fuel 20 in a region of the mold 10. When the first liquefied fuel 20 cools, a resulting first non-liquid layer will be tapered from the deeper portion toward an opposite end (not shown). Likewise, after the second liquefied fuel 30 is poured onto the tapered first non-liquid layer, the mold 10 can be placed on an unlevel surface to cause a deeper accumulation of the second fuel 30 in the same region of the mold 10. A resulting non-liquid composite sheet will have an exaggerated wedge shape (not shown). However, the second liquefied fuel 30 can be poured onto the tapered first non-liquid layer, and the mold 10 can be placed on a level surface to impose a tapered form on a second non-liquid layer (not shown). This is because the second fuel 30 simply accumulates in a region of the mold 10 that the tapered first non-liquid layer does not occupy. Although not shown, a composite sheet with tapered layers of non-liquid fuel formed in this manner would have the rectangular shape that the composite sheet 25 shown in FIG. 4 has, but the non-liquid layers will be tapered in opposite directions instead of being substantially equally thick like the first and second non-liquid layers 21 and 31 of the composite sheet 25.

The first non-liquid layer 21 preferably has a coloring agent and a scenting agent in its composition, as does the second non-liquid layer 31. The coloring and scenting agents can be any of several materials commonly used in the candle making industry for causing candles to have visible and aromatic features, such as potpourri, dried botanicals, perfumes, and dyes. Therefore, the spiral fuel body 40 has the first and second non-liquid layers 21 and 31 distinguishable by thickness, color and aroma. The first and second non-liquid layers 21 and 31 remain distinguishable by these features for the life of the candle.

Alternatively or additionally, the first and second non-liquid layers 21 and 31 can be made distinguishable by other means commonly used in the candle making art. For example, a composite sheet may have layers with different porosities, fuel components, and decorative materials in various combinations (not shown).

Figure 10:
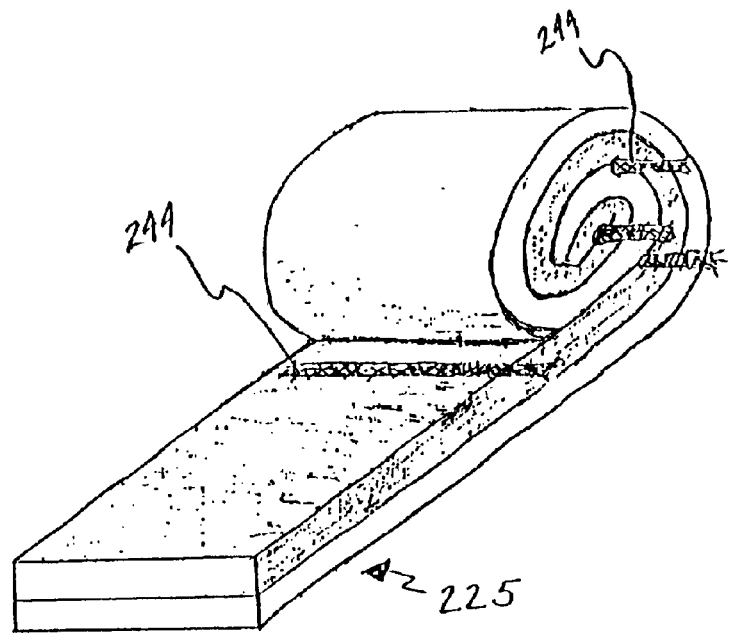
FIG. 10 is a view in perspective illustrating an intermediate step in a second alternative method.

An alternative way of performing the method is shown in FIGS. 7 and 8. A wick 144 is inserted earlier in the method by being placed on a composite sheet 125, near an end of the sheet 125. Placing the wick 144 near an end causes the wick 144 to be in the center of the resulting candle, although the wick 144 does not have to be in the center. The wick 144 is laid substantially parallel to an edge 126 of the composite sheet 125, which is opposite to a second edge 127, with an overhanging portion 146 of the wick 144 extending beyond an adjacent edge, at least a length sufficient for lighting. At the end of the sheet 125 near the wick 144, a leader portion of the composite sheet 125 is curled upwardly and toward the opposite second edge 127, and folded over the wick 144. The remaining length of the composite sheet 125 is progressively rolled around the wick 144, as described above for the preferred method and as shown in FIG. 8. As shown in FIG. 9, the end product is a fuel body 110 having the wick 144 imbedded centrally and longitudinally with the overhanging portion 146 extending upwardly for lighting the candle. Alternatively, as shown in FIG. 10, a wick 244 may be placed on a sheet 225, which is rolled a distance to incorporate that wick 244, before another wick 244 is placed on the sheet 225. Repeating these steps provides a candle having a multiplicity of wicks (not shown). Similarly, a multiplicity of wicks can be placed on a sheet and spaced apart from each other along the length of the sheet, and the sheet can then be rolled in order to incorporate the wicks into a fuel body (not shown). These alternative methods do not require a wick to be placed near an end of the sheet.

Figure 11:
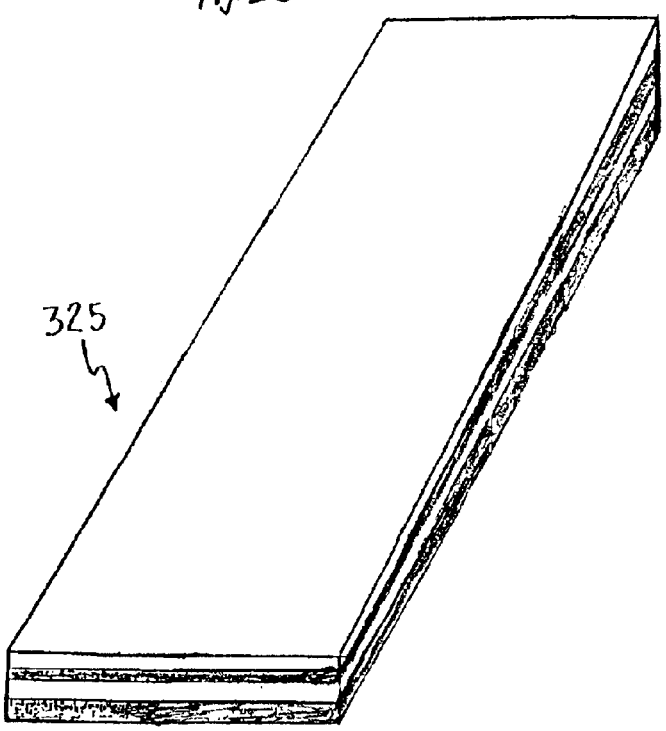
FIG. 11 is a view in perspective illustrating a structure formed in an intermediate step in a third alternative method.
Figure 12:
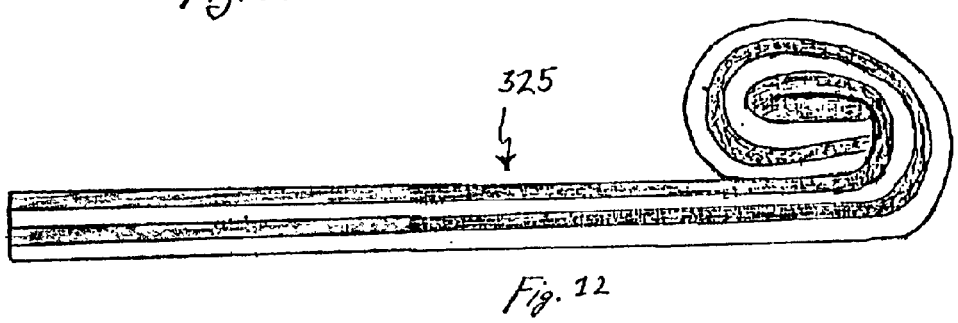
FIG. 12 is a side view illustrating a step in the alternative method of FIG. 11.

In another alternative embodiment shown in FIG. 11, a composite sheet 325 of non-liquid candle fuel is formed to have more than two layers. The illustrated composite sheet 325 has four layers and is formed in the same way as the composite sheet 25 described above. Any number of layers may be used, so long as they are not too thin, and a resulting composite sheet is not too thick. The composite sheet 325 is rolled, as shown in FIG. 12, into a spiral fuel body, which is not shown but can be made similar to the embodiments shown in FIGS. 6 and 9. A wick is inserted by rolling the composite sheet 325 around the wick, or by forming at least one hole, such as by drilling, in a rolled fuel body formed from the composite sheet 325 and inserting the wick in the hole.

Figure 13:
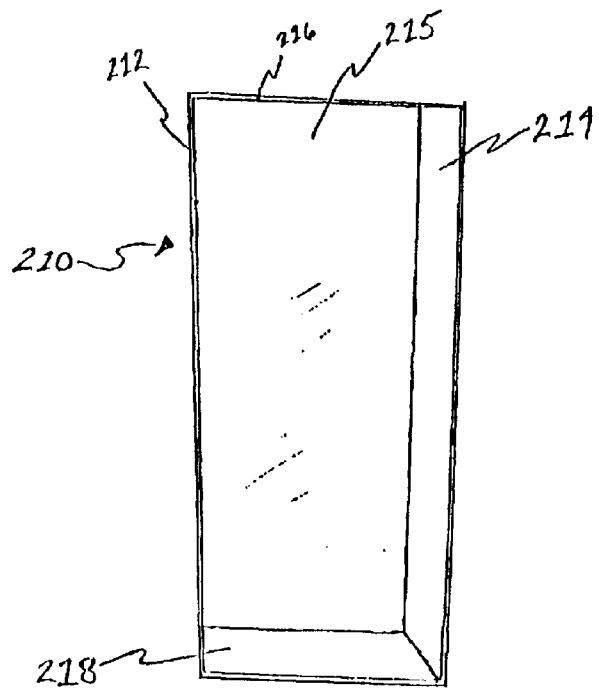
FIG. 13 is a top view illustrating a candle mold apparatus.
Figure 14:
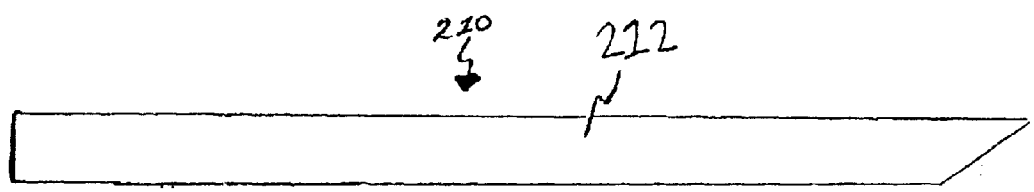
FIG. 14 is a side view illustrating the candle mold apparatus of FIG. 13.

In the preferred and alternative methods described so far, the composite sheets 25, 125, 225, and 325 are formed in the mold 10, which is substantially rectangular, as shown in FIGS. 1–3. But the method can be performed using a mold having a different shape, such as a circular or triangular shaped mold (not shown) or a mold 210 as illustrated in FIGS. 13 and 14. However, a mold shape that is circular may produce an eccentrically shaped rolled candle that requires a base or a pedestal for support in an operable position. Typically, for candles, including rolled candles, a wick being substantially perpendicular to a surface upon which the candle sits characterizes the operable position.

The rolled candle method is particularly suitable for producing candles that resemble bakery products. For example, the candle shown in FIG. 6 resembles a real jellyroll pastry (not shown). The first and second non-liquid layers 21 and 31 are colored, scented, and structured to mimic the corresponding layers of the real jellyroll pastry. When the composite sheet 25 is rolled into the fuel body 40, the resulting candle has the aroma and appearance like the fruit jelly and cream in the real jellyroll pastry. The perpendicular sidewalls of the mold 10 produce opposite planar sides on the jellyroll candle shown in FIG. 6 to display the spiral pattern of fruit jelly, cake, and cream, like the sides on a real jellyroll pastry.

Turning now to the mold 210 shown in FIGS. 13 and 14, the mold 210 is elongated, having four walls. A first sidewall 212 is perpendicular to a bottom wall 215. A second sidewall 214 is obtuse to the bottom wall 215 and opposite to the first sidewall 212. A first end wall 216 is perpendicular to the bottom wall 215. A second end wall 218 is obtuse to the bottom wall 215 and opposite to the first end wall 216. The opposite sidewalls 212 and 214 are not parallel, and the first end wall 216 is slightly longer than the second end wall 218. The preferred mold 210 has a length of about twenty-one inches and a width of about two and one half inches. Regardless of the size of the mold 210, the ratio of the length to the width is desirably about equal to ten. A fuel body produced by the mold 210, or by a mold of the same shape and proportions but of a different size, should have substantially equal diametrical vertical and horizontal lengths.

A sheet (not shown) formed in the mold 210 has a long beveled edge formed by the obtuse second sidewall 214 and a short beveled edge formed by the obtuse second end wall 218. The sheet also has a short perpendicular edge formed by the first end wall 216 and a long perpendicular edge formed by the first sidewall 212. The mold 210 can also be used to form a sheet (not shown) with obtusely angled edges and dual layers, like the dual layers of the composite sheets 25 and 125 formed in the mold 10 and shown in FIGS. 4 and 7, respectively. However, the mold 210 is not confined to the described method of forming multiple layers, and can be used to form a single layer sheet. Regardless of the number of layers, the sheets are formed in the same manner as in the method described above; a warm liquefied wax is poured into a mold and is cooled into a non-liquid layer.

Figure 15:
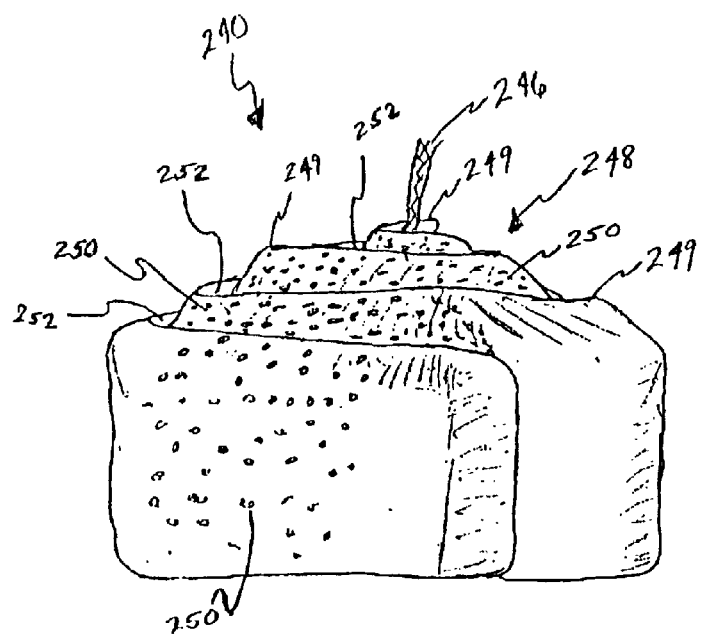
FIG. 15 is a side view illustrating a candle formed using the mold apparatus of FIGS. 13 and 14.

Similar to the steps depicted in FIGS. 7 and 8, after the sheet with beveled edges has been removed from the mold 210, a wick is placed on the sheet, near an edge of the sheet, with a protruding portion 246 of the wick extending beyond an adjacent edge (step not shown). Rolling the sheet from that edge, around the wick, produces a rolled spiral fuel body 240 as shown in FIG. 15. The rolled spiral fuel body 240 has a diametrical vertical dimension substantially equal to its diametrical horizontal length. A candle (not shown) with similar proportions can be made using a smaller mold (not shown) that is similar to the rectangular mold 10 shown in FIGS. 1–3. Although such a candle would be similar to the spiral fuel body 240 shown in FIG. 15, the smaller version of the rectangular mold 10 would produce a layered fuel body with a planar top surface.

Continuing with the structure of the spiral fuel body 240 as shown in FIG. 15, the fuel body 240 has a top surface 248 from which the protruding portion 246 of the wick upwardly extends. The beveled edge on the sheet that is formed against the obtuse longer sidewall 214 is partially responsible for the tapering form of the top surface 248 of the fuel body 240. The top surface 248 is tapered, because the long beveled edge formed against the sidewall 214 is spirally oriented on the top surface 248, forming a beveled ridge 249 that spirals outwardly and downwardly from the center of the top surface 248, which is near the protruding portion 246 of the wick. The beveled surface of the ridge 249 angles upwardly toward the center of the top surface 248. The ridge 249 is angled upwardly to avoid a stair step pattern across the top surface 248 that would result from using a mold having all four walls intersecting the bottom wall 215 at substantially perpendicular angles, but having non-parallel longitudinally extending sidewalls, like the sidewalls 212 and 214 of the mold 210.

The tapering form also occurs because the sidewalls 212 and 214 of the mold 210 are not parallel, so the end of the sheet molded against the first end wall 216 is longer than the opposite end of the sheet molded against the second end wall 218. The sheet is rolled from the end molded by the longer first end wall 216. This longer end of the sheet becomes positioned centrally in the rolled fuel body 240, forming a peak on the top surface 248 near the protruding portion 246 of the wick, from where the top surface 248 slopes downwardly and outwardly.

As shown in FIG. 15, the fuel body 240 resembles a real pastry roll, because of the tapered top surface 248. The tapered fuel body 240 is one of many alternative embodiments of a rolled fuel body for a candle made from the mold 210. The mold 210 can produce other candles that resemble pastry products having a tapered form.

The spiraling beveled ridge 249 on the top surface 248 can also serve an important functional role that enhances the authentic appearance of the fuel body 240. A wax 250 that is made to resemble a frosting on a real pastry roll can be applied to the top surface 248 of the fuel body 240 and retained by the beveled ridge 249, which forms a spiral dam. While warmed or liquefied, the frosting-like wax 250 is spread or dripped onto the ridge 249 and into a gutter 252 that spirals adjacently to the ridge 249. The wax 250 fills the gutter 252 and overflows outwardly over the next portion of the ridge 249. The frosting-like wax 250 flows in this pattern until the outer surface of the fuel body 240 is reached. The frosting-like wax 250 solidifies on the top surface 248 and on the outer surface, mimicking the frosting distribution on a real pastry roll.

While certain preferred embodiments of the present invention have been disclosed in detail, it is to be understood that various modifications may be adopted without departing from the spirit of the invention or scope of the following claims.

What is claimed is:

1. A quadrangular elongated mold for fabricating a tapered rolled layered candle, the mold comprising:
   (a) a bottom wall, opposing sidewalls, and opposing end walls, one of the sidewalls and one of the end walls being formed at an obtuse angle relative to the bottom wall; and
   (b) the opposing sidewalls longitudinally extending in non-parallel relationship to each other.

2. The mold in accordance with claim 1, wherein the sidewall opposite the sidewall at an obtuse angle extends upwardly substantially perpendicular to the bottom wall.

3. The mold in accordance with claim 2, wherein the end wall opposite the end wall at an obtuse angle extends upwardly substantially perpendicular to the bottom wall.

4. The mold in accordance with claim 1, wherein the end wall opposite the end wall at an obtuse angle extends upwardly substantially perpendicular to the bottom wall.

5. The mold in accordance with claim 3, wherein the aspect ratio of the sidewalls relative to the end walls is about 10.

6. The mold in accordance with claim 5, wherein the mold has a depth of about one half inch.

* * * * *